US012597610B2

(12) United States Patent
Jin et al.

(10) Patent No.: US 12,597,610 B2
(45) Date of Patent: Apr. 7, 2026

(54) NEGATIVE ELECTRODE ACTIVE MATERIAL, AND ELECTROCHEMICAL APPARATUS AND ELECTRONIC APPARATUS USING THE SAME

(71) Applicant: Ningde Amperex Technology Limited, Ningde (CN)

(72) Inventors: Wenbo Jin, Ningde (CN); Jiali Dong, Ningde (CN); Lihong He, Ningde (CN); Yuansen Xie, Ningde (CN)

(73) Assignee: NINGDE AMPEREX TECHNOLOGY LIMITED, Ningde City (CN)

( * ) Notice: Subject to any disclaimer, the term of this patent is extended or adjusted under 35 U.S.C. 154(b) by 637 days.

(21) Appl. No.: 17/971,811

(22) Filed: Oct. 24, 2022

(65) Prior Publication Data

US 2023/0052908 A1     Feb. 16, 2023

Related U.S. Application Data

(63) Continuation of application No. PCT/CN2020/086741, filed on Apr. 24, 2020.

(51) Int. Cl.
*H01M 4/583*     (2010.01)
*H01M 4/02*     (2006.01)
*H01M 4/04*     (2006.01)

(52) U.S. Cl.
CPC ......... *H01M 4/583* (2013.01); *H01M 4/0404* (2013.01); *H01M 2004/021* (2013.01); *H01M 2004/027* (2013.01)

(58) Field of Classification Search
CPC ............... H01M 4/583; H01M 4/0404; H01M 2004/021; H01M 2004/027; H01M 4/36;
(Continued)

(56) References Cited

U.S. PATENT DOCUMENTS

2002/0039685 A1* 4/2002 Choi ..................... C01B 32/205
                                                                      423/448
2005/0031947 A1* 2/2005 Yamada ............ H01M 10/0436
                                                                      429/162

(Continued)

FOREIGN PATENT DOCUMENTS

CN        1228619 A      9/1999
CN        1507102 A      6/2004
(Continued)

OTHER PUBLICATIONS

Office Action issued on Sep. 30, 2021, in connection with corresponding Chinese Application No. 202080004517.1 (12 pp., including machine-generated English translation).
(Continued)

*Primary Examiner* — Daniel S Gatewood
(74) *Attorney, Agent, or Firm* — Maier & Maier, PLLC

(57) ABSTRACT

A negative electrode active material includes a carbon material, where the carbon material has a specific degree of graphitization and aspect ratio distribution. A degree of graphitization Gr of the carbon material measured by an X-ray diffraction analysis method is 0.82 to 0.92, and based on a total quantity of particles of the carbon material, a proportion of particles with an aspect ratio greater than 3.3 in the carbon material is less than 10%. The negative electrode active material helps to improve cycle performance of the electrochemical apparatus. FIG. 1.

20 Claims, 4 Drawing Sheets

(58) Field of Classification Search
CPC ......... H01M 4/364; H01M 2010/4292; H01M
4/133; H01M 4/587; H01M 10/0525;
C01P 2002/70; C01P 2002/74; C01P
2002/78; C01P 2002/82; C01P 2004/51;
C01P 2004/54; C01P 2006/10; C01P
2006/40; Y02E 60/10; C01B 32/20
See application file for complete search history.

(56) References Cited

U.S. PATENT DOCUMENTS

| | | | |
|---|---|---|---|
| 2015/0099180 A1 | 4/2015 | Cericola et al. | |
| 2017/0033360 A1 | 2/2017 | Michaud et al. | |
| 2020/0006801 A1* | 1/2020 | Cao ................... | H01M 10/0525 |
| 2020/0144603 A1* | 5/2020 | Si .......................... | H01M 4/386 |

FOREIGN PATENT DOCUMENTS

| | | | | |
|---|---|---|---|---|
| CN | 1726168 | A | | 1/2006 |
| CN | 102110805 | A | * | 6/2011 |
| CN | 102347481 | A | * | 2/2012 |
| CN | 102362380 | A | | 2/2012 |
| CN | 102637859 | A | | 8/2012 |
| CN | 102992307 | B | | 8/2015 |
| CN | 106744916 | A | | 5/2017 |
| CN | 108832075 | A | | 11/2018 |
| CN | 109713225 | A | | 5/2019 |
| CN | 109748587 | A | | 5/2019 |
| CN | 110148714 | A | | 8/2019 |
| EP | 2560229 | A2 | | 2/2013 |
| JP | 11317229 | A | | 11/1999 |
| JP | 2002362913 | A | | 12/2002 |
| JP | 2003119013 | A | | 4/2003 |
| JP | 2013191382 | A | | 9/2013 |
| JP | 2013211254 | A | | 10/2013 |
| JP | 201733947 | A | | 2/2017 |
| JP | 2018147672 | A | | 9/2018 |
| WO | 2017057123 | A1 | | 4/2017 |
| WO | 2018207410 | A1 | | 11/2018 |

OTHER PUBLICATIONS

International Search Report with English translation and Written Opinion with Machine Translation issued on Jan. 26, 2021, in corresponding International Application No. PCT/CN2020/086741; 13 pages.
Office Action issued on Sep. 20, 2022, in connection with corresponding Japanese Application No. 2021512580 (18 pp., including machine-generated English translation).
Extended Search Report issued on May 15, 2023, in corresponding European Application No. 20932220.5, 7 pages.
Office Action issued on Dec. 16, 2022, in corresponding Indian Application No. 202117043261, 5 pages.
Office Action issued on Jan. 24, 2023, in corresponding Japanese Application No. 2021-512580, 3 pages.
English Translation of the Relevant Part of Machinery Industry Standard of the People's Republic of China JB/T 4220-2011 "Determination Method of Lattice Parameters of Artificial Graphite", 2011, 1 page.

* cited by examiner

NEGATIVE ELECTRODE ACTIVE MATERIAL, AND ELECTROCHEMICAL APPARATUS AND ELECTRONIC APPARATUS USING THE SAME

CROSS REFERENCE TO RELATED APPLICATIONS

This application is a continuation application of PCT Application Serial No. PCT/CN2020/086741, filed Apr. 24, 2020, the content of which is incorporated by reference in its entirety.

TECHNICAL FIELD

This application relates to the field of energy storage, and specifically, to a negative electrode active material, and an electrochemical apparatus and an electronic apparatus using the same.

BACKGROUND

Electrochemical apparatuses (for example, lithium-ion batteries) are widely applied due to advantages such as environmental friendliness, a high working voltage, a large specific capacity, and long cycle life, and therefore have become the most promising new green chemical power source in the world. Small-sized lithium-ion batteries are generally used as power sources to drive portable electronic communication devices (for example, camcorders, mobile phones, or notebook computers), especially power sources for high-performance portable devices. Middle-sized and large-sized lithium-ion batteries with high output are developed and applied to electric vehicles (EV) and large-scale energy storage systems (ESS). As the lithium-ion batteries are widely applied, cycle performance of the lithium-ion batteries has become a critical technical problem that needs an urgent solution. Making improvements to active materials in electrode plates is one of research trends to resolve the foregoing problem.

In view of this, it is essential to provide an improved negative electrode active material, and an electrochemical apparatus and an electronic apparatus using the same.

SUMMARY

This application provides a negative electrode active material, and an electrochemical apparatus and an electronic apparatus using the same, to resolve at least one existing problem in the related art to some extent.

According to an aspect of this application, this application provides a negative electrode active material, where the negative electrode active material includes a carbon material, a degree of graphitization Gr of the carbon material that is measured in an X-ray diffraction analysis method is 0.82 to 0.92, and based on a total quantity of particles of the carbon material, a proportion of particles with an aspect ratio greater than 3.3 in the carbon material is less than 10%.

In some embodiments, the degree of graphitization Gr of the carbon material that is measured in the X-ray diffraction analysis method is 0.85 to 0.90. In some embodiments, the degree of graphitization Gr of the carbon material that is measured in the X-ray diffraction analysis method is 0.82, 0.83, 0.84, 0.85, 0.86, 0.87, 0.88, 0.89, 0.90, 0.91, or 0.92 or falls within a ranged defined by any two of the preceding values.

In some embodiments, based on the total quantity of the particles of the carbon material, a proportion of particles with an aspect ratio greater than 3.3 in the carbon material is less than 8%. In some embodiments, based on the total quantity of the particles of the carbon material, a proportion of particles with an aspect ratio greater than 3.3 in the carbon material is less than 6%. In some embodiments, based on the total quantity of the particles of the carbon material, a proportion of particles with an aspect ratio greater than 3.3 in the carbon material is greater than 1%. In some embodiments, based on the total quantity of the particles of the carbon material, a proportion of particles with an aspect ratio greater than 3.3 in the carbon material is greater than 3%. In some embodiments, based on the total quantity of the particles of the carbon material, a proportion of particles with an aspect ratio greater than 3.3 in the carbon material is greater than 5%. In some embodiments, based on the total quantity of the particles of the carbon material, a proportion of particles with an aspect ratio greater than 3.3 in the carbon material falls within a ranged defined by any two of the preceding endpoint values.

In this embodiment of this application, based on the total quantity of the particles of the carbon material, a proportion of particles with an aspect ratio greater than 2 in the carbon material is less than 50%, and a proportion of particles with an aspect ratio greater than 1.5 in the carbon material is less than 80%.

In some embodiments, based on the total quantity of the particles of the carbon material, a proportion of particles with an aspect ratio greater than 2 in the carbon material is less than 45%. In some embodiments, based on the total quantity of the particles of the carbon material, a proportion of particles with an aspect ratio greater than 2 in the carbon material is less than 40%. In some embodiments, based on the total quantity of the particles of the carbon material, a proportion of particles with an aspect ratio greater than 2 in the carbon material is greater than 30%. In some embodiments, based on the total quantity of the particles of the carbon material, a proportion of particles with an aspect ratio greater than 2 in the carbon material is greater than 35%. In some embodiments, based on the total quantity of the particles of the carbon material, a proportion of particles with an aspect ratio greater than 2 in the carbon material falls within a ranged defined by any two of the preceding endpoint values.

In some embodiments, based on the total quantity of the particles of the carbon material, a proportion of particles with an aspect ratio greater than 1.5 in the carbon material is less than 75%. In some embodiments, based on the total quantity of the particles of the carbon material, a proportion of particles with an aspect ratio greater than 1.5 in the carbon material is less than 70%. In some embodiments, based on the total quantity of the particles of the carbon material, a proportion of particles with an aspect ratio greater than 1.5 in the carbon material is greater than 50%. In some embodiments, based on the total quantity of the particles of the carbon material, a proportion of particles with an aspect ratio greater than 1.5 in the carbon material is greater than 55%. In some embodiments, based on the total quantity of the particles of the carbon material, a proportion of particles with an aspect ratio greater than 1.5 in the carbon material is greater than 60%. In some embodiments, based on the total quantity of the particles of the carbon material, a proportion of particles with an aspect ratio greater than 1.5 in the carbon material is greater than 65%. In some embodiments, based on the total quantity of the particles of the carbon material, a proportion of particles with an aspect ratio greater than 1.5 in the carbon material falls within a ranged defined by any two of the preceding endpoint values.

Based on this embodiment of this application, a ratio of a crystal grain size La of a crystal grain of the carbon material along a horizontal axis that is measured in the X-ray diffraction analysis method to a crystal grain size Lc of a crystal grain of the carbon material along a vertical axis that is measured in the X-ray diffraction analysis method is K, and Gr and K satisfy the following relationship: $4.0 \leq K \times Gr \leq 5.2$. In some embodiments, Gr and K satisfy the following relationship: $4.2 \leq K \times Gr \leq 5.0$. In some embodiments, Gr and K satisfy the following relationship: $4.5 \leq K \times Gr \leq 4.8$.

Based on this embodiment of this application, a particle size of the negative electrode active material satisfies the following relationship: $35 \mu m < Dv99 - Dv10 < 50 \mu m$. In some embodiments, a particle size of the negative electrode active material satisfies the following relationship: $42 \mu m < Dv99 - Dv10 < 48 \mu m$. In some embodiments, a particle size of the negative electrode active material satisfies the following relationship: $43 \mu m < Dv99 - Dv10 < 45 \mu m$.

Based on this embodiment of this application, an interplanar spacing d002 of the negative electrode active material that is measured in the X-ray diffraction analysis method satisfies $d002 \geq 0.3365$ nm. In some embodiments, an interplanar spacing d002 of the negative electrode active material that is measured in the X-ray diffraction analysis method satisfies $d002 \geq 0.3370$ nm. In some embodiments, an interplanar spacing d002 of the negative electrode active material that is measured in the X-ray diffraction analysis method satisfies $d002 \geq 0.3375$ nm. In some embodiments, the interplanar spacing d002 of the negative electrode active material that is measured in the X-ray diffraction analysis method is 0.3365 nm, 0.3368 nm, 0.3370 nm, 0.3372 nm, or 0.3375 or falls within a ranged defined by any two of the preceding values.

Based on this embodiment of this application, a ratio of a peak area C004 of a crystal plane (004) to a peak area C110 of a crystal plane (110) of the negative electrode active material that is measured in the X-ray diffraction analysis method satisfies $C004/C110 \leq 8$. In some implementations, C004/C110 for the negative electrode active material that is measured in the X-ray diffraction analysis method satisfies $C004/C110 \leq 7.5$. In some implementations, C004/C110 for the negative electrode active material that is measured in the X-ray diffraction analysis method satisfies $C004/C110 \leq 7$. In some implementations, C004/C110 for the negative electrode active material that is measured in the X-ray diffraction analysis method satisfies $C004/C110 \leq 6.5$. In some implementations, C004/C110 for the negative electrode active material that is measured in the X-ray diffraction analysis method satisfies $C004/C110 \leq 6$. In some implementations, C004/C110 for the negative electrode active material that is measured in the X-ray diffraction analysis method satisfies $C004/C110 \leq 5.5$. In some implementations, C004/C110 for the negative electrode active material that is measured in the X-ray diffraction analysis method satisfies $C004/C110 \leq 5$. In some implementations, C004/C110 for the negative electrode active material that is measured in the X-ray diffraction analysis method satisfies $C004/C110 \geq 3$. In some implementations, C004/C110 for the negative electrode active material that is measured in the X-ray diffraction analysis method satisfies $C004/C110 \geq 3.5$. In some implementations, C004/C110 for the negative electrode active material that is measured in the X-ray diffraction analysis method satisfies $C004/C110 \geq 4$. In some implementations, C004/C110 for the negative electrode active material that is measured in the X-ray diffraction analysis method satisfies $C004/C110 \geq 4.5$. In some implementations, C004/C110 for the negative electrode active material that is measured in the X-ray diffraction analysis method falls within a ranged defined by any two of the preceding endpoint values.

Based on this embodiment of this application, a gram capacity C mAh/g of the negative electrode active material and the degree of graphitization Gr of the carbon material satisfy the following relationships: $390Gr - C \leq 20$, and $C \leq 350$.

In some embodiments, C and Gr satisfy the following relationship: $390Gr - C \leq 18$. In some embodiments, C and Gr satisfy the following relationship: $390Gr - C \leq 15$. In some embodiments, C and Gr satisfy the following relationship: $390Gr - C \leq 12$. In some embodiments, C and Gr satisfy the following relationship: $390Gr - C \leq 15$. In some embodiments, C and Gr satisfy the following relationship: $390Gr - C \leq 10$. In some embodiments, C and Gr satisfy the following relationship: $390Gr - C \leq 8$. In some embodiments, C and Gr satisfy the following relationship: $390Gr - C \leq 5$. In some embodiments, C and Gr satisfy the following relationship: $390Gr - C \geq 1$. In some embodiments, C and Gr satisfy the following relationship: $390Gr - C \geq 3$. In some embodiments, a value of $390Gr - C$ falls within a ranged defined by any two of the preceding endpoint values.

In some embodiments, $C \leq 340$. In some embodiments, $C \leq 330$. In some embodiments, $C \leq 320$. In some embodiments, $C \leq 310$. In some embodiments, $C \leq 300$. In some embodiments, $C \geq 250$. In some embodiments, $C \geq 280$. In some embodiments, $C \geq 290$. In some embodiments, a value C of the gram capacity of the negative electrode active material falls within a ranged defined by any two of the preceding endpoint values.

According to another aspect of this application, this application provides an electrochemical apparatus, and the electrochemical apparatus includes a positive electrode, an electrolyte solution, and a negative electrode. The negative electrode includes a negative electrode active material layer and a negative electrode current collector, and the negative electrode active material layer includes the negative electrode active material according to this application.

Based on this embodiment of this application, a compacted density PD $g/cm^3$ of the negative electrode active material layer and the degree of graphitization Gr of the carbon material satisfy the following relationship: $PD \leq 2.5Gr - 0.45 \leq 1.85$. In some embodiments, PD and Gr satisfy the following relationship: $PD \leq 2.5Gr - 0.45 \leq 1.80$. In some embodiments, PD and Gr satisfy the following relationship: $PD \leq 2.5Gr - 0.45 \leq 1.75$. In some embodiments, PD and Gr satisfy the following relationship: $PD \leq 2.5Gr - 0.45 \leq 1.70$. In some embodiments, PD and Gr satisfy the following relationship: $PD \leq 2.5Gr - 0.45 \leq 1.65$. In some embodiments, PD and Gr satisfy the following relationship: $PD \leq 2.5Gr - 0.45 \leq 1.60$.

Based on this embodiment of this application, a compacted density of the negative electrode active material layer is 1.45 $g/cm^3$ to 1.75 $g/cm^3$. In some embodiments, a compacted density of the negative electrode active material layer is 1.50 $g/cm^3$ to 1.70 $g/cm^3$. In some embodiments, a compacted density of the negative electrode active material layer is 1.55 $g/cm^3$ to 1.65 $g/cm^3$. In some embodiments, a compacted density of the negative electrode active material layer is 1.45 $g/cm^3$, 1.50 $g/cm^3$, 1.55 $g/cm^3$, 1.60 $g/cm^3$, 1.65 $g/cm^3$, 1.70 $g/cm^3$, or 1.75 $g/cm^3$ or falls within a ranged defined by any two of the preceding values.

Based on this embodiment of this application, a ratio C004'/C110' of a peak area C004' of a plane (004) to a peak area C110' of a plane (110) of the negative electrode active material layer that is measured in the X-ray diffraction analysis method is 7 to 18. In some embodiments, C004'/C110' for the negative electrode active material layer that is measured in the X-ray diffraction analysis method is 10 to 16. In some embodiments, C004'/C110' for the negative electrode active material layer that is measured in the X-ray diffraction analysis method is 12 to 15. In some embodiments, C004'/C110' for the negative electrode active material layer that is measured in the X-ray diffraction analysis method is 7, 10, 12, 14, 16, or 18 or falls within a ranged defined by any two of the preceding values.

Based on this embodiment of this application, a ratio Id/Ig of a peak intensity Id of the negative electrode active material layer at 1340 cm$^{-1}$ to 1380 cm$^{-1}$ to a peak intensity Ig of the negative electrode active material layer at 1560 cm$^{-1}$ to 1600 cm$^{-1}$ measured in a Raman spectroscopy method is 0.2 to 0.5. In some embodiments, Id/Ig for the negative electrode active material layer that is measured in the Raman spectroscopy method is 0.25 to 0.45. In some embodiments, Id/Ig for the negative electrode active material layer that is measured in the Raman spectroscopy method is 0.3 to 0.4. In some embodiments, Id/Ig for the negative electrode active material layer that is measured in the Raman spectroscopy method is 0.2, 0.25, 0.3, 0.35, 0.4, 0.45, or 0.5 or falls within a ranged defined by any two of the preceding values.

According to still another aspect of this application, this application provides an electronic apparatus, including the electrochemical apparatus according to this application.

Additional aspects and advantages of this application are partially described and presented in the later description, or explained by implementation of the embodiments of the application.

BRIEF DESCRIPTION OF DRAWINGS

In this specification, the drawings crucial in describing the embodiments of this application or the prior art are to be briefly described to describe the embodiments of this application. Obviously, the drawings in the following description are only for some of the embodiments in this application. For persons skilled in the art, drawings of other embodiments can still be obtained without creative work based on structures illustrated in these drawings.

DETAILED DESCRIPTION

Embodiments of this application are described in detail below. In this specification of this application, the same or similar components and components with the same or similar functions are denoted by similar reference signs. Related embodiments of the drawings described herein are illustrative, diagrammatic and used to provide a basic understanding for this application. The embodiments of this application shall not be construed as a limitation on this application.

In the description of embodiments and claims, a list of items preceded by the term of "at least one type of" may mean any combination of the listed items. For example, if items A and B are listed, the phrase "at least one type of A and B" means that only A exists, only B exists, or A and B exist. In another instance, if items A, B, and C are listed, the phrase "at least one type of A, B, and C" means that only A exists; only B exists; only C exists; A and B (excluding C) exist; A and C (excluding B) exist; B and C (excluding A) exist; or all of A, B, and C exist. The item A may include one element or a plurality of elements. The item B may include one element or a plurality of elements. The item C may include one element or a plurality of elements.

As electrochemical apparatuses (for example, lithium-ion batteries) are widely applied, requirements for performance of the electrochemical apparatuses are continuously increasing. Cycle performance is a key indicator for evaluating the performance of the lithium-ion batteries. Improving an active material in an electrode plate through raw material selection, granulation process controlling, and surface coating can improve cycle performance of a lithium-ion battery to a limited extent, which can no longer meet the growing market demands.

In this application, a degree of graphitization of the negative electrode active material and an aspect ratio and distribution of particles are adjusted, to resolve the foregoing problem. Specifically, this application provides a negative electrode active material, the negative electrode active material includes a carbon material, a degree of graphitization Gr of the carbon material that is measured in an X-ray diffraction analysis method is 0.82 to 0.92, and based on a total quantity of particles of the carbon material, a proportion of particles with an aspect ratio greater than 3.3 in the carbon material is less than 10%.

Figure 1:
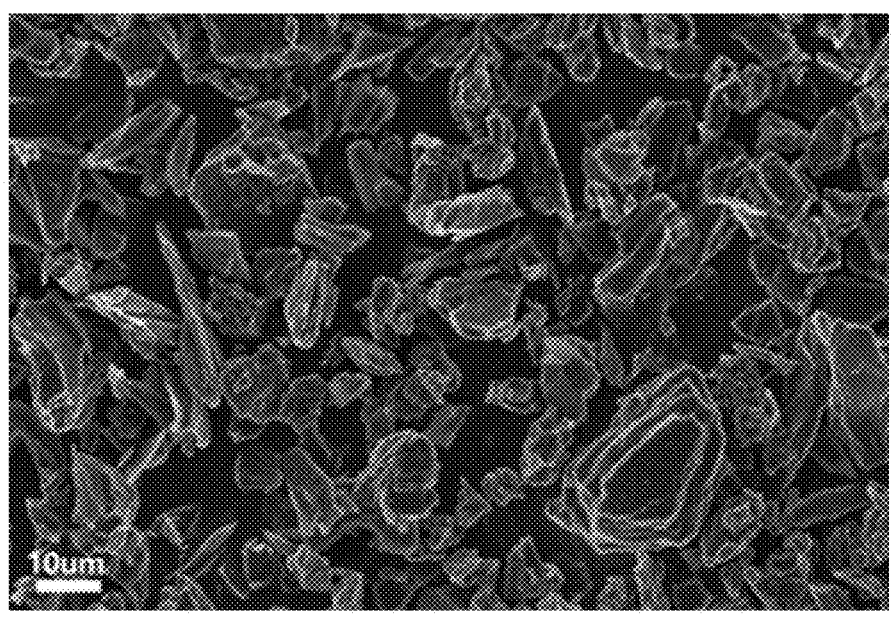
FIG. 1 is a scanning electron microscope (SEM) diagram of a negative electrode active material used in Example 3 of this application.
Figure 2:
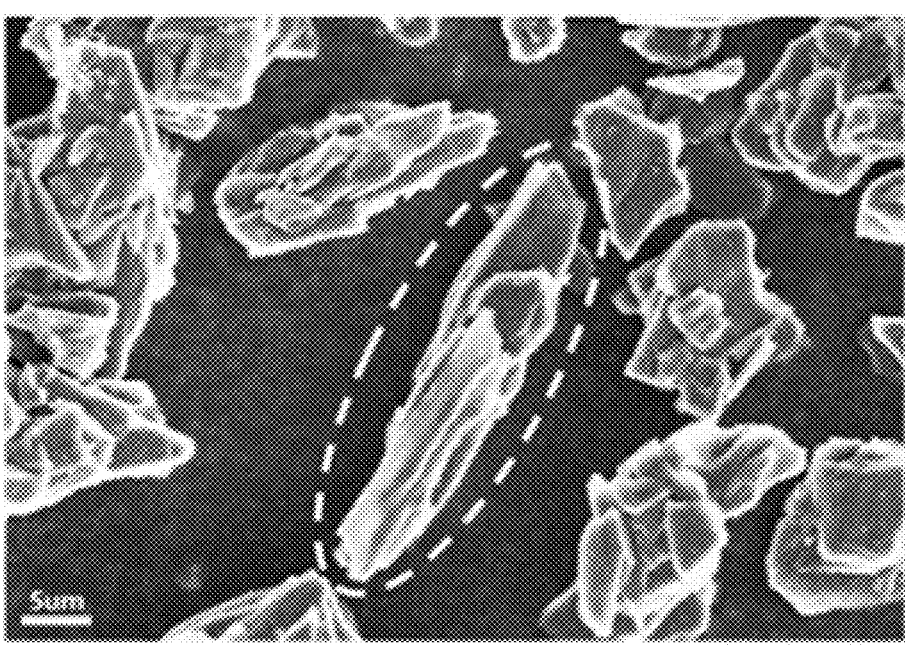
FIG. 2 shows SEM morphology of a particle with an aspect ratio of approximately 5.0 in a carbon material used in Example 3 of this application.

As used in this specification, the "aspect ratio" of the carbon material is a ratio of a longest diameter passing through an interior of the particle of the carbon material to a longest diameter (that is, a wide diameter) perpendicular thereto. The aspect ratio of the carbon material can be obtained through dynamic particle image analysis (for example, by using the Sympatec QICPIC dynamic particle image analyzer). In a preparation process of the negative electrode active material, the aspect ratio of the carbon material can be controlled by grade. When the aspect ratio of the carbon material is relatively small, the particle of the carbon material is in an elongate shape. When the aspect ratio of the carbon material is closer to 1, it indicates that a long diameter and a wide diameter of the particle of the carbon material are closer, that is, a shape of the particle of the carbon material is closer to a square or a circle. FIG. 1 is a scanning electron microscope (SEM) diagram of a carbon material used in Example 3 of this application. A particle with an aspect ratio of approximately 5.0 is in an elongate shape, and has morphology shown in FIG. 2. A spherical particle of the carbon material has a relatively small specific surface area, consumes less electrolyte solution, and has a low orientation degree in the negative electrode, which facilitates infiltration by the electrolyte solution and improves the cycle performance of the electrochemical apparatus.

As used in this specification, the "degree of graphitization" of the carbon material is a degree of transforming non-graphitic carbon in the carbon material into graphite-like carbon at high temperature or during secondary heating. When the carbon material has a relatively high degree of graphitization (for example, greater than 0.92), an interplanar spacing d002 of the carbon material is decreased, which is not conducive to deintercalation of lithium ions from the carbon material. When the carbon material has a relatively low degree of graphitization (for example, less than 0.92), there are a large number of $SP^3$ bonds in the carbon material, and layers of the carbon material are mutually constrained, making a structure of the carbon material more stable.

In some embodiments, the degree of graphitization Gr of the carbon material that is measured in the X-ray diffraction analysis method is 0.85 to 0.90. In some embodiments, the degree of graphitization Gr of the carbon material that is measured in the X-ray diffraction analysis method is 0.82, 0.83, 0.84, 0.85, 0.86, 0.87, 0.88, 0.89, 0.90, 0.91, or 0.92 or falls within a ranged defined by any two of the preceding values.

In some embodiments, based on the total quantity of the particles of the carbon material, a proportion of particles with an aspect ratio greater than 3.3 in the carbon material is less than 8%. In some embodiments, based on the total quantity of the particles of the carbon material, a proportion of particles with an aspect ratio greater than 3.3 in the carbon material is less than 6%. In some embodiments, based on the total quantity of the particles of the carbon material, a proportion of particles with an aspect ratio greater than 3.3 in the carbon material is greater than 1%. In some embodiments, based on the total quantity of the particles of the carbon material, a proportion of particles with an aspect ratio greater than 3.3 in the carbon material is greater than 3%. In some embodiments, based on the total quantity of the particles of the carbon material, a proportion of particles with an aspect ratio greater than 3.3 in the carbon material is greater than 5%. In some embodiments, based on the total quantity of the particles of the carbon material, a proportion of particles with an aspect ratio greater than 3.3 in the carbon material falls within a ranged defined by any two of the preceding endpoint values.

When the carbon material in the negative electrode active material satisfies both the degree of graphitization and the proportion of particles with a specific aspect ratio, the cycle performance of the electrochemical apparatus may be significantly improved, and service life of the electrochemical apparatus may be prolonged.

Figure 3:
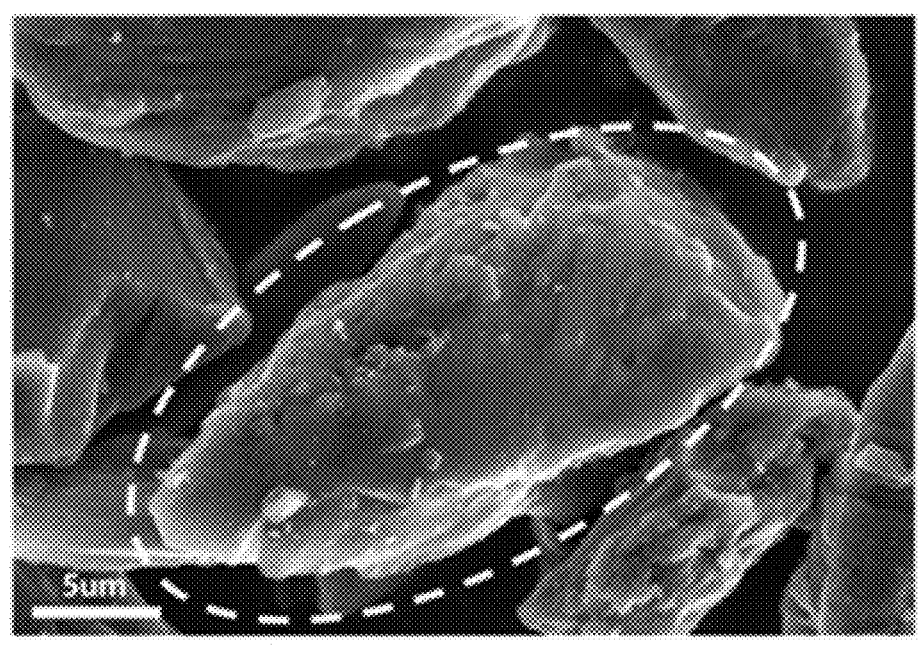
FIG. 3 shows SEM morphology of a particle with an aspect ratio of approximately 2.5 in a carbon material used in Example 3 of this application.
Figure 4:
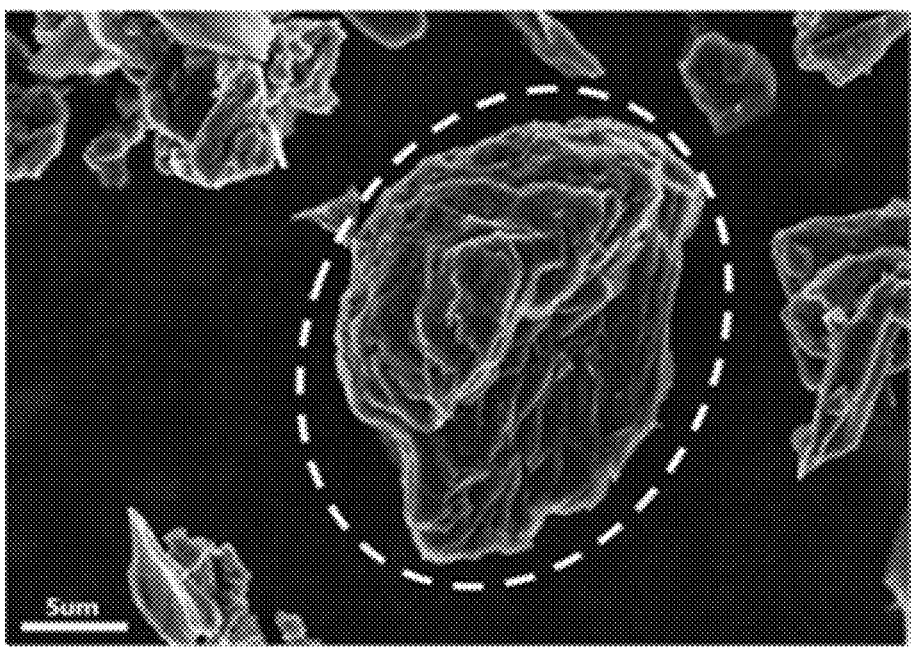
FIG. 4 shows SEM morphology of a particle with an aspect ratio of approximately 1.5 in a carbon material used in Example 3 of this application.
Figure 5:
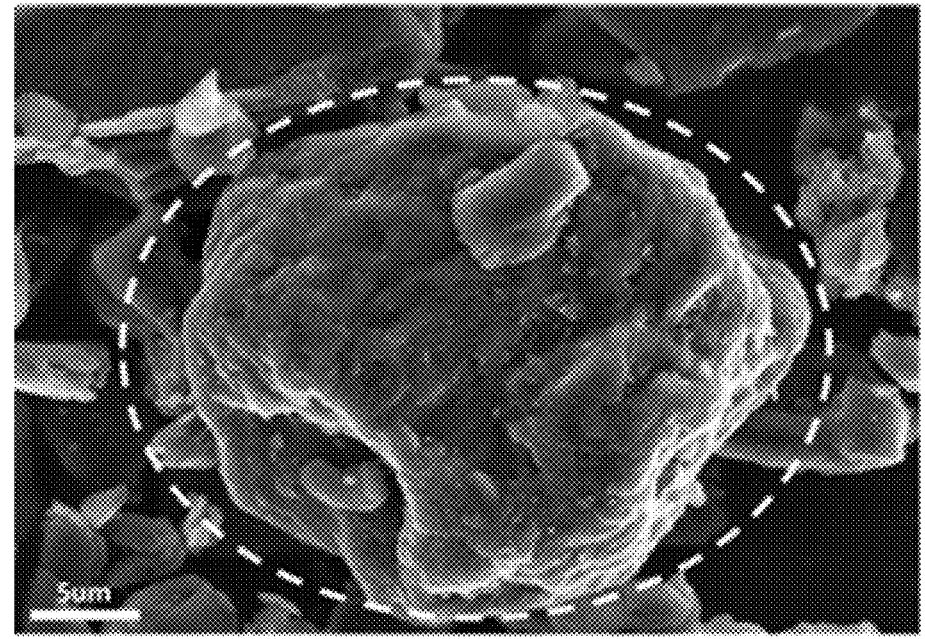
FIG. 5 shows SEM morphology of a particle with an aspect ratio of approximately 1.0 in a carbon material used in Example 3 of this application.

In this embodiment of this application, based on the total quantity of the particles of the carbon material, a proportion of particles with an aspect ratio greater than 2 in the carbon material is less than 50%, and a proportion of particles with an aspect ratio greater than 1.5 in the carbon material is less than 80%. As shown in FIG. 3, a particle with an aspect ratio of approximately 2.5 is in a shape of a spheroid. As shown in FIG. 4 and FIG. 5, shapes of particles with aspect ratios of approximately 1.5 and 1.0 are close to a sphere. When the aspect ratio of the carbon material is relatively small, contact areas of the particles of the carbon material are more evenly distributed, which helps the electrolyte solution to infiltrate into the negative electrode active material layer. Using particles with different shapes collaboratively can further improve the cycle performance of the electrochemical apparatus.

In some embodiments, based on the total quantity of the particles of the carbon material, a proportion of particles with an aspect ratio greater than 2 in the carbon material is less than 45%. In some embodiments, based on the total quantity of the particles of the carbon material, a proportion of particles with an aspect ratio greater than 2 in the carbon material is less than 40%. In some embodiments, based on the total quantity of the particles of the carbon material, a proportion of particles with an aspect ratio greater than 2 in the carbon material is greater than 30%. In some embodiments, based on the total quantity of the particles of the carbon material, a proportion of particles with an aspect ratio greater than 2 in the carbon material is greater than 35%. In some embodiments, based on the total quantity of the particles of the carbon material, a proportion of particles with an aspect ratio greater than 2 in the carbon material falls within a ranged defined by any two of the preceding endpoint values.

In some embodiments, based on the total quantity of the particles of the carbon material, a proportion of particles with an aspect ratio greater than 1.5 in the carbon material is less than 75%. In some embodiments, based on the total quantity of the particles of the carbon material, a proportion of particles with an aspect ratio greater than 1.5 in the carbon material is less than 70%. In some embodiments, based on the total quantity of the particles of the carbon material, a proportion of particles with an aspect ratio greater than 1.5 in the carbon material is greater than 50%. In some embodiments, based on the total quantity of the particles of the carbon material, a proportion of particles with an aspect ratio greater than 1.5 in the carbon material is greater than 55%. In some embodiments, based on the total quantity of the particles of the carbon material, a proportion of particles with an aspect ratio greater than 1.5 in the carbon material is greater than 60%. In some embodiments, based on the total quantity of the particles of the carbon material, a proportion of particles with an aspect ratio greater than 1.5 in the carbon material is greater than 65%. In some embodiments, based on the total quantity of the particles of the carbon material, a proportion of particles with an aspect ratio greater than 1.5 in the carbon material falls within a ranged defined by any two of the preceding endpoint values.

Based on this embodiment of this application, a ratio of a crystal grain size La of a crystal grain of the carbon material along a horizontal axis that is measured in the X-ray diffraction analysis method to a crystal grain size Lc of a crystal grain of the carbon material along a vertical axis that is measured in the X-ray diffraction analysis method is K, and Gr and K satisfy the following relationship: $4.0 \leq K \times Gr \leq 5.2$. In some embodiments, Gr and K satisfy the following relationship: $4.2 \leq K \times Gr \leq 5.0$. In some embodiments, Gr and K satisfy the following relationship: $4.5 \leq K \times Gr \leq 4.8$. When the ratio K of the crystal grain size La to the crystal grain size Lc of the carbon material and the degree of graphitization Gr satisfy the foregoing relationship, the cycle performance of the electrochemical apparatus can be further improved.

Based on this embodiment of this application, a particle size of the negative electrode active material satisfies the following relationship: $35 \mu m < Dv99-Dv10 < 50 \mu m$. In some embodiments, a particle size of the negative electrode active material satisfies the following relationship: $42 \mu m < Dv99-Dv10 \leq 48 \mu m$. In some embodiments, a particle size of the negative electrode active material satisfies the following relationship: $43 \mu m < Dv99-Dv10 < 45 \mu m$. When Dv99 and Dv10 are controlled to meet the foregoing relationship by controlling the particle size of the negative electrode active material, the cycle performance of the electrochemical apparatus can be further improved.

Based on this embodiment of this application, an interplanar spacing d002 of the negative electrode active material that is measured in the X-ray diffraction analysis method satisfies d002≥0.3365 nm. In some embodiments, an interplanar spacing d002 of the negative electrode active material that is measured in the X-ray diffraction analysis method satisfies d002≥0.3370 nm. In some embodiments, an interplanar spacing d002 of the negative electrode active material that is measured in the X-ray diffraction analysis method satisfies d002≥0.3375 nm. In some embodiments, the interplanar spacing d002 of the negative electrode active material that is measured in the X-ray diffraction analysis method is 0.3365 nm, 0.3368 nm, 0.3370 nm, 0.3372 nm, or 0.3375 or falls within a ranged defined by any two of the preceding values. When the interplanar spacing d002 of the negative electrode active material falls within the foregoing range, lithium ions may rapidly deintercalate, and damage to the negative electrode active material layer may be reduced, thereby further improving the cycle performance of the electrochemical apparatus.

Based on this embodiment of this application, a ratio of a peak area C004 of a crystal plane (004) to a peak area C110 of a crystal plane (110) of the negative electrode active material that is measured in the X-ray diffraction analysis method satisfies C004/C110≤8. In some implementations, C004/C110 for the negative electrode active material that is measured in the X-ray diffraction analysis method satisfies C004/C110≤7.5. In some implementations, C004/C110 for the negative electrode active material that is measured in the X-ray diffraction analysis method satisfies C004/C110≤7. In some implementations, C004/C110 for the negative electrode active material that is measured in the X-ray diffraction analysis method satisfies C004/C110≤6.5. In some implementations, C004/C110 for the negative electrode active material that is measured in the X-ray diffraction analysis method satisfies C004/C110≤6. In some implementations, C004/C110 for the negative electrode active material that is measured in the X-ray diffraction analysis method satisfies C004/C110≤5.5. In some implementations, C004/C110 for the negative electrode active material that is measured in the X-ray diffraction analysis method satisfies C004/C110≤5. In some implementations, C004/C110 for the negative electrode active material that is measured in the X-ray diffraction analysis method satisfies C004/C110≥3. In some implementations, C004/C110 for the negative electrode active material that is measured in the X-ray diffraction analysis method satisfies C004/C110≥3.5. In some implementations, C004/C110 for the negative electrode active material that is measured in the X-ray diffraction analysis method satisfies C004/C110≥4. In some implementations, C004/C110 for the negative electrode active material that is measured in the X-ray diffraction analysis method satisfies C004/C110≥4.5. In some implementations, C004/C110 for the negative electrode active material that is measured in the X-ray diffraction analysis method falls within a ranged defined by any two of the preceding endpoint values.

A value of C004/C110 can reflect orientation of a material. A smaller value of C004/C110 leads to greater isotropy of the material; and a larger value of C004/C110 leads to greater anisotropy of the material. When the value of C004/C110 for the negative electrode active material is relatively large, the lithium ions in the negative electrode active material deintercalate in one direction, and therefore deintercalation paths of the lithium ions become longer, which is not conducive to rapid deintercalation of the lithium ions, causing an adverse impact on the cycle performance of the electrochemical apparatus. When the value of C004/C110 for the negative electrode active material falls within the foregoing range, in a cycle process, the lithium ions can intercalate or deintercalate in various directions, which reduces diffusion paths of the lithium ions and loss of active lithium ions, thereby further improving the cycle performance of the electrochemical apparatus.

Based on this embodiment of this application, a gram capacity C mAh/g of the negative electrode active material and the degree of graphitization Gr of the carbon material satisfy the following relationships: 390Gr–C≤20, and C≤350.

In some embodiments, C and Gr satisfy the following relationship: 390Gr–C≤18. In some embodiments, C and Gr satisfy the following relationship: 390Gr–C≤15. In some embodiments, C and Gr satisfy the following relationship: 390Gr–C≤12. In some embodiments, C and Gr satisfy the following relationship: 390Gr–C≤15. In some embodiments, C and Gr satisfy the following relationship: 390Gr–C≤10. In some embodiments, C and Gr satisfy the following relationship: 390Gr–C≤8. In some embodiments, C and Gr satisfy the following relationship: 390Gr–C≤5. In some embodiments, C and Gr satisfy the following relationship: 390Gr–C≥1. In some embodiments, C and Gr satisfy the following relationship: 390Gr–C≥3. In some embodiments, a value of 390Gr–C falls within a ranged defined by any two of the preceding endpoint values.

In some embodiments, C≤340. In some embodiments, C≤330. In some embodiments, C≤320. In some embodiments, C≤310. In some embodiments, C≤300. In some embodiments, C≥250. In some embodiments, C≥280. In some embodiments, C≥290. In some embodiments, a value C of the gram capacity of the negative electrode active material falls within a ranged defined by any two of the preceding endpoint values.

When the value C of the gram capacity of the negative electrode active material and the degree of graphitization Gr of the carbon material satisfy the foregoing relationship, the negative electrode active material may have balanced performance, thereby further improving the cycle performance of the electrochemical apparatus.

This application further provides an electrochemical apparatus, and the electrochemical apparatus includes a positive electrode, a negative electrode, a separator, and an electrolyte solution. The positive electrode, the negative electrode, the separator, and the electrolyte solution applicable to this application are described below.

Negative Electrode

The negative electrode used in the electrochemical apparatus in this application includes a negative electrode current collector and a negative electrode active material layer, and the negative electrode active material layer includes the negative electrode active material according to this application.

Based on this embodiment of this application, a compacted density PD g/cm³ of the negative electrode active material layer and the degree of graphitization Gr of the carbon material satisfy the following relationship: PD≤2.5Gr-0.45≤1.85. In some embodiments, PD and Gr satisfy the following relationship: PD≤2.5Gr-0.45≤1.80. In some embodiments, PD and Gr satisfy the following relationship: PD≤2.5Gr-0.45≤1.75. In some embodiments, PD and Gr satisfy the following relationship: PD≤2.5Gr-0.45≤1.70. In some embodiments, PD and Gr satisfy the following relationship: PD≤2.5Gr-0.45≤1.65. In some embodiments, PD and Gr satisfy the following relationship: PD≤2.5Gr-0.45≤1.60.

Based on this embodiment of this application, a compacted density of the negative electrode active material layer is 1.45 g/cm$^3$ to 1.75 g/cm$^3$. In some embodiments, a compacted density of the negative electrode active material layer is 1.50 g/cm$^3$ to 1.70 g/cm$^3$. In some embodiments, a compacted density of the negative electrode active material layer is 1.55 g/cm$^3$ to 1.65 g/cm$^3$. In some embodiments, a compacted density of the negative electrode active material layer is 1.45 g/cm$^3$, 1.50 g/cm$^3$, 1.55 g/cm$^3$, 1.60 g/cm$^3$, 1.65 g/cm$^3$, 1.70 g/cm$^3$, or 1.75 g/cm$^3$ or falls within a ranged defined by any two of the preceding values.

When the compacted density of the negative electrode active material layer is excessively high, the electrolyte solution is less liable to infiltrate into the negative electrode active material, which is not conducive to rapid participation of the lithium ions in an electrochemical reaction, causing adverse impact on the cycle performance of the lithium-ion battery. When the compacted density of the negative electrode active material layer and the degree of graphitization of the carbon material satisfy the foregoing relationship, or the compacted density of the negative electrode active material falls within the foregoing range, the cycle performance of the electrochemical apparatus can be further improved.

Based on this embodiment of this application, a ratio C004'/C110' of a peak area C004' of a plane (004) to a peak area C110' of a plane (110) of the negative electrode active material layer that is measured in the X-ray diffraction analysis method falls within a range of 7 to 18. In some embodiments, C004'/C110' for the negative electrode active material layer that is measured in the X-ray diffraction analysis method falls within a range of 10 to 16. In some embodiments, C004'/C110' for the negative electrode active material layer that is measured in the X-ray diffraction analysis method falls within a range of 12 to 15. In some embodiments, C004'/C110' for the negative electrode active material layer that is measured in the X-ray diffraction analysis method is 7, 10, 12, 14, 16, or 18 or falls within a ranged defined by any two of the preceding values. When C004'/C110' for the negative electrode active material layer falls within the foregoing range, the cycle performance of the electrochemical apparatus can be further improved.

Based on this embodiment of this application, a ratio Id/Ig of a peak intensity Id of the negative electrode active material layer at 1340 cm$^{-1}$ to 1380 cm$^{-1}$ to a peak intensity Ig of the negative electrode active material layer at 1560 cm$^{-1}$ to 1600 cm$^{-1}$ measured in a Raman spectroscopy method is 0.2 to 0.5. In some embodiments, Id/Ig for the negative electrode active material layer that is measured in the Raman spectroscopy method is 0.25 to 0.45. In some embodiments, Id/Ig for the negative electrode active material layer that is measured in the Raman spectroscopy method is 0.3 to 0.4. In some embodiments, Id/Ig for the negative electrode active material layer that is measured in the Raman spectroscopy method is 0.2, 0.25, 0.3, 0.35, 0.4, 0.45, or 0.5 or falls within a ranged defined by any two of the preceding values. Id/Ig for the negative electrode active material layer can reflect a surface defect degree of the negative electrode active material layer. When Id/Ig is excessively small, there are a small quantity of surface defects on the negative electrode active material layer, and graphite flakes are tightly and regularly arranged. When Id/Ig is excessively great, there are a large quantity of surface defects on the negative electrode active material layer, which affects stability of a solid electrolyte film (SEI film). When the surface defect degree Id/Ig of the negative electrode active material layer falls within the foregoing range, there are a moderate quantity of surface defects on the negative electrode active material layer, which ensures intercalation or deintercalation of the lithium ions and the stability of the SEI film, thereby helping improve the cycle performance of the electrochemical apparatus.

The negative electrode current collector applied to this application may be selected from copper foil, nickel foil, stainless steel foil, titanium foil, nickel foam, copper foam, a polymer substrate coated with a conductive metal, and a combination thereof.

Based on this embodiment of this application, the negative electrode further includes a conductive layer. In some implementations, the conductive material of the conductive layer may include any conductive material so long as the conductive material does not cause a chemical change. Non-limiting examples of the conductive materials include a carbon-based material (for example, natural graphite, artificial graphite, carbon black, acetylene black, Ketjen black, carbon fiber, carbon nanotubes, or graphene), a metal-based material (for example, metal powder or metal fiber, such as copper, nickel, aluminum, and silver), a conductive polymer (for example, polyphenylene derivative), and a mixture thereof.

Based on an embodiment of this application, the negative electrode further includes a binder, and the binder is selected from at least one of the following: polyvinyl alcohol, carboxymethyl cellulose, hydroxypropyl cellulose, diacetyl cellulose, polyvinyl chloride, carboxylated polyvinyl chloride, polyvinyl fluoride, a polymer containing ethylene oxide, polyvinylpyrrolidone, polyurethane, polytetrafluoroethylene, poly (1,1-difluoroethylene), polyethylene, polypropylene, styrene-butadiene rubber, acrylic styrene-butadiene rubber, epoxy resin, and nylon.

Positive Electrode

The positive electrode includes a positive electrode current collector and a positive electrode active material arranged on the positive electrode current collector. The positive electrode active material is not limited to a specific type, and may be selected based on demands.

In some implementations, the positive electrode active material includes a positive electrode material capable of absorbing and releasing lithium (Li). Examples of positive electrode materials capable of absorbing or releasing lithium (Li) may include lithium cobalt oxide, lithium nickel cobalt manganate, lithium nickel cobalt aluminate, lithium manganate oxide, lithium manganese iron phosphate, lithium vanadium phosphate, lithium vanadyl phosphate, lithium iron phosphate, lithium titanate, and a lithium-rich manganese-based material.

Specifically, a chemical formula of lithium cobalt oxide may be a chemical formula 1:

$$Li_xCo_aM1_bO_{2-c} \qquad \text{Chemical formula 1}$$

M1 is selected from at least one of nickel (Ni), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), tungsten (W), yttrium (Y), lanthanum (La), zirconium (Zr), and silicon (Si), and values of x, a, b, and c respectively fall within the following ranges: 0.8≤x≤1.2, 0.8≤a≤1, 0≤b≤0.2, and −0.1≤c≤0.2.

A chemical formula of lithium nickel cobalt manganate or lithium nickel cobalt aluminate may be a chemical formula 2:

$$Li_yNi_dM2_eO_{2-f} \qquad \text{Chemical formula 2}$$

M2 is selected from at least one of cobalt (Co), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), tungsten (W), zirconium (Zr), and silicon (Si), and values of y, d, e, and f respectively fall within the following ranges: $0.8 \le y \le 1.2$, $0.3 \le d \le 0.98$, $0.02 \le e \le 0.7$, and $-0.1 \le f \le 0.2$.

A chemical formula of lithium manganate oxide may be a chemical formula 3:

$$Li_zMn_{2-g}M3_gO_{4-h} \qquad \text{Chemical formula 3}$$

M3 is selected from at least one of cobalt (Co), nickel (Ni), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), and tungsten (W), and values of z, g, and h respectively fall within the following ranges: $0.8 \le z \le 1.2$, $0 \le g \le 1.0$, and $-0.2 \le h \le 0.2$.

In some embodiments, a weight of the positive electrode active material layer is 1.5 to 15 times a weight of the negative electrode active material layer. In some embodiments, a weight of the positive electrode active material layer is 3 to 10 times a weight of the negative electrode active material layer. In some embodiments, a weight of the positive electrode active material layer is 5 to 8 times a weight of the negative electrode active material layer. In some embodiments, a weight of the positive electrode active material layer is 1.5, 2, 3, 4, 5, 6, 7, 8, 9, 10, 11, 12, 13, 14, or 15 times a weight of the negative electrode active material layer.

In some embodiments, there may be a coating on a surface of the positive electrode active material layer, or the positive electrode active material layer may be mixed with another compound with a coating. The coating may include at least one coating element compound selected from oxide of a coating element, hydroxide of the coating element, oxyhydroxides of the coating element, oxycarbonate (oxycarbonate) of the coating element, and hydroxycarbonate (hydroxycarbonate) of the coating element. The compound applied to the coating may be amorphous or crystalline. The coating element included in the coating may include Mg, Al, Co, K, Na, Ca, Si, Ti, V, Sn, Ge, Ga, B, As, Zr, F, or a mixture thereof. The coating may be applied in any method on condition that the method does not cause adverse impact on performance of the positive electrode active material. For example, the method may include any coating method known to persons of ordinary skill in the art, such as spraying or dipping.

In some implementations, the positive electrode active material layer further includes a binder, and optionally, further includes a positive electrode conductive material.

The binder may enhance bonding between particles of the positive electrode active material, and further enhance bonding between the positive electrode active material and the current collector. Non-limiting examples of the binder include: polyvinyl alcohol, hydroxypropyl cellulose, diacetyl cellulose, polyvinyl chloride, carboxylated polyvinyl chloride, polyvinyl fluoride, a polymer containing ethylene oxide, polyvinylpyrrolidone, polyurethane, polytetrafluoroethylene, poly (1,1-difluoroethylene), polyethylene, polypropylene, styrene-butadiene rubber, acrylic styrene-butadiene rubber, epoxy resin, and nylon.

The positive electrode active material layer includes a positive electrode conductive material, so that the electrode is conductive. The positive electrode conductive material may include any conductive material so long as the positive electrode conductive material does not cause a chemical change. Non-limiting examples of the positive electrode conductive material include: a carbon-based material (for example, natural graphite, artificial graphite, carbon black, acetylene black, Ketjen black, and carbon fiber), a metal-based material (for example, metal powder, and metal fiber, including copper, nickel, aluminum, silver, and the like), a conductive polymer (for example, a polyphenylene derivative), and any mixture thereof.

The positive electrode current collector applied to the electrochemical apparatus according to this application may be, but is not limited to, aluminum (Al).

Electrolyte Solution

The electrolyte solution applicable to this embodiment of this application may be an electrolyte solution known in the prior art.

The electrolyte in the electrolyte solution applicable to this embodiment of this application includes, but is not limited to: inorganic lithium salt, such as $LiClO_4$, $LiAsF_6$, $LiPF_6$, $LiBF_4$, $LiSbF_6$, $LiSO_3F$, or $LiN(FSO_2)_2$; organic lithium salt containing fluorine, such as $LiCF_3SO_3$, $LiN(FSO_2)(CF_3SO_2)$, $LiN(CF_3SO_2)_2$, $LiN(C_2F_5SO_2)_2$, cyclic 1,3-hexafluoropropane disulfonylimide lithium, cyclic 1,2-tetrafluoroethane disulfonylimide lithium, $LiN(CF_3SO_2)(C_4F_9SO_2)$, $LiC(CF_3SO_2)_3$, $LiPF_4(CF_3)_2$, $LiPF_4(C_2F_5)_2$, $LiPF_4(CF_3SO_2)_2$, $LiPF_4(C_2F_5SO_2)_2$, $LiBF_2(CF_3)_2$, $LiBF_2(C_2F_5)_2$, $LiBF_2(CF_3SO_2)_2$, or $LiBF_2(C_2F_5SO_2)_2$; or lithium salt containing a dicarboxylic acid complex, such as lithium bis(oxalato)borate, lithium difluoro(oxalato)borate, lithium tris(oxalato) phosphate, difluorobis(oxalato) lithium phosphate, or tetrafluoro(oxalato) lithium phosphate. In addition, one of the foregoing electrolytes may be used alone, or two or more of the foregoing electrolytes may be used together. In some embodiments, the electrolyte includes a combination of $LiPF_6$ and $LiBF_4$. In some embodiments, the electrolyte includes a combination of the inorganic lithium salt such as $LiPF_6$ or $LiBF_4$ and the organic lithium salt containing fluorine such as $LiCF_3SO_3$, $LiN(CF_3SO_2)_2$, or $LiN(C_2F_5SO_2)_2$. In some embodiments, the electrolyte includes $LiPF_6$.

In some embodiments, a concentration of the electrolyte falls within a range of 0.8 mol/L to 3 mol/L, such as a range of 0.8 mol/L to 2.5 mol/L, a range of 0.8 mol/L to 2 mol/L, a range of 1 mol/L to 2 mol/L, for another example, 1 mol/L, 1.15 mol/L, 1.2 mol/L, 1.5 mol/L, 2 mol/L, or 2.5 mol/L.

Solvents applicable to the electrolyte solution in this embodiment of this application include, but are not limited to, cyclic carbonate, linear carbonate, cyclic carboxylic acid ester, chain carboxylic acid ester, cyclic ether, chain ether, an organic solvent containing phosphorus, an organic solvent containing sulfur, and an aromatic solvent containing fluorine.

In some embodiments, the cyclic carbonate includes, but is not limited to, ethylene carbonate (ethylene carbonate, EC), propylene carbonate (propylene carbonate, PC), and butylene carbonate.

In some embodiments, the cyclic carbonate has 3 to 6 carbon atoms.

In some embodiments, the linear carbonate includes, but is not limited to, dimethyl carbonate, ethyl methyl carbonate, diethyl carbonate (diethyl carbonate, DEC), methyl n-propyl carbonate, ethyl n-propyl carbonate, di-n-propyl carbonate, and linear carbonate substituted by fluorine, such as bis(fluoromethyl) carbonate, bis(di fluoromethyl) carbonate, bis(trifluoromethyl)carbonate, bis(2-fluoroethyl)carbonate, bis(2,2-difluoroethyl)carbonate, bis(2,2,2-trifluoroethyl) carbonate, 2-fluoroethyl methyl carbonate, 2,2-difluoroethyl methyl carbonate, and 2,2,2-trifluoroethyl methyl carbonate.

In some embodiments, the cyclic carboxylate includes, but is not limited to, γ-butyrolactone and γ-valerolactone. In some embodiments, some hydrogen atoms of the cyclic carboxylate may be substituted by fluorine.

In some embodiments, the linear carboxylate includes, but is not limited to: methyl acetate, ethyl acetate, propyl acetate, isopropyl acetate, butyl acetate, sec-butyl acetate, isobutyl acetate, tertiary acetate butyl ester, methyl propionate, ethyl propionate, propyl propionate, isopropyl propionate, methyl butyrate, ethyl butyrate, propyl butyrate, methyl isobutyrate, ethyl isobutyrate, methyl valerate, ethyl valerate, methyl pivalate, and ethyl pivalate. In some embodiments, some hydrogen atoms of the linear carboxylate may be substituted by fluorine. In some embodiments, fluorine-substituted linear carboxylate includes, but is not limited to: methyl trifluoroacetate, ethyl trifluoroacetate, propyl trifluoroacetate, butyl trifluoroacetate, and 2,2,2-trifluoroethyl trifluoroacetate.

In some embodiments, the cyclic ether includes, but is not limited to, tetrahydrofuran, 2-methyltetrahydrofuran, 1,3-dioxolane, 2-methyl-1,3-dioxolane, 4-methyl-1,3-dioxolane, 1,3-dioxane, 1,4-dioxane, and dimethoxypropane.

In some embodiments, the chain ether includes, but is not limited to, dimethoxymethane, 1,1-dimethoxyethane, 1,2-dimethoxyethane, diethoxymethane, 1,1-diethoxyethane, 1,2-diethoxyethane, ethoxymethoxymethane, 1,1-ethoxymethoxyethane, and 1,2-ethoxymethoxyethane.

In some embodiments, the organic solvent containing phosphorus includes, but is not limited to, trimethyl phosphate, triethyl phosphate, dimethyl ethyl phosphate, methyl diethyl phosphate, ethylene methyl phosphate, ethylene ethyl phosphate, triphenyl phosphate, trimethyl phosphite, triethyl phosphite, triphenyl phosphite, tris(2,2,2-trifluoroethyl) phosphate and tris(2,2,3,3,3-pentafluoropropyl) phosphate.

In some embodiments, the organic solvent containing sulfur includes, but is not limited to, sulfolane, 2-methyl sulfolane, 3-methyl sulfolane, dimethyl sulfone, diethyl sulfone, ethyl methyl sulfone, methyl propyl sulfone, dimethyl sulfoxide, methyl methanesulfonate, ethyl methanesulfonate, methyl ethanesulfonate, ethyl ethanesulfonate, dimethyl sulfate, diethyl sulfate, and dibutyl sulfate. In some embodiments, some hydrogen atoms of the organic solvent containing sulfur may be substituted by fluorine.

In some embodiments, the aromatic solvent containing fluorine includes, but is not limited to, fluorobenzene, difluorobenzene, trifluorobenzene, tetrafluorobenzene, pentafluorobenzene, hexafluorobenzene, and trifluoromethylbenzene.

In some embodiments, the solvent used in the electrolyte solution in this application includes one or more of the foregoing solvents. In some embodiments, the solvent used in the electrolyte solution in this application includes cyclic carbonate, linear carbonate, cyclic carboxylate, linear carboxylate, and a combination thereof. In some embodiments, solvents used in the electrolyte solution in this application include a group of organic solvents selected from the following substances: ethylene carbonate, propylene carbonate, diethyl carbonate, ethyl propionate, propyl propionate, n-propyl acetate, ethyl acetate, and a combination thereof. In some embodiments, the solvent used in the electrolyte solution in this application includes: ethylene carbonate, propylene carbonate, diethyl carbonate, ethyl propionate, propyl propionate, γ-butyrolactone, or a combination thereof.

Additives in the electrolyte solution applicable to this embodiment of this application include, but are not limited to, a compound with 2 or 3 cyano groups, cyclic carbonate containing a carbon-carbon double bond, a compound containing a sulfur-oxygen double bond, and lithium difluorophosphate.

In some embodiments, the compound with 2 or 3 cyano groups may include at least one of succinonitrile (SN), adiponitrile (ADN), ethylene glycol bis(propionitrile) ether (EDN), 1,3,5-pentanetricarbonitrile, 1,2,3-propanetricarbonitrile, hexane-1,3,6-tricarbonitrile (HTCN), hexane-1,2,6-tricarbonitrile, 1,2,3-tris(2-cyanoethoxy)propane (TCEP), or 1,2,4-tris(2-cyanoethoxy)butane.

In some embodiments, the cyclic carbonate containing a carbon-carbon double bond specifically includes, but is not limited to at least one of vinylene carbonate, methyl vinylene carbonate, ethyl vinylene carbonate, vinyl ethylene carbonate, or 1,2-dimethyl vinylene carbonate.

In some embodiments, the compound containing a sulfur-oxygen double bond includes, but is not limited to at least one of vinyl sulfate, 1,2-propanediol sulfate, 1,3-propane sultone, 1-fluoro-1,3-propane sultone, 2-fluoro-1,3-propane sultone, or 3-fluoro-1,3-propane sultone.

Separator

In some implementations, a separator is provided between the positive electrode and the negative electrode to prevent short circuit. The separator used in this embodiment of this application is not particularly limited to any material or shape, and may be based on any technology disclosed in the prior art. In some implementations, the separator includes a polymer or an inorganic substance formed by a stable material of the electrolyte solution in this application.

For example, the separator may include a substrate layer and a surface treatment layer. The substrate layer is a non-woven fabric, membrane, or composite membrane having a porous structure, and a material of the substrate layer is selected from at least one of polyethylene, polypropylene, polyethylene terephthalate, and polyimide. Specifically, a polypropylene porous membrane, a polyethylene porous membrane, polypropylene nonwoven fabric, polyethylene nonwoven fabric, or polypropylene-polyethylene-polypropylene porous composite membrane may be selected. The porous structure can improve heat resistance, oxidation resistance, and electrolyte infiltration performance of the separator, and enhance adhesion between the separator and the electrode plate.

The surface treatment layer is provided on at least one surface of the substrate layer, and the surface treatment layer may be a polymer layer or an inorganic layer, or may be a layer formed by mixing the polymer and the inorganic substance.

The inorganic layer includes inorganic particles and a binder. The inorganic particles are selected from one or a combination of aluminum oxide, silicon oxide, magnesium oxide, titanium oxide, hafnium oxide, tin oxide, ceria oxide, nickel oxide, zinc oxide, calcium oxide, zirconium oxide, yttrium oxide, silicon carbide, boehmite, aluminum hydroxide, magnesium hydroxide, calcium hydroxide, and barium sulfate. The binder is selected from one or a combination of a polyvinylidene fluoride, a vinylidene fluoride-hexafluoropropylene copolymer, a polyamide, a polyacrylonitrile, a polyacrylate, a polyacrylic acid, a polyacrylate, a polyvinylpyrrolidone, a polyvinyl ether, a polymethyl methacrylate, a polytetrafluoroethylene, and a polyhexafluoropropylene.

The polymer layer includes a polymer, and a material of the polymer is selected from at least one of polyamide, polyacrylonitrile, acrylate polymer, polyacrylic acid, poly-acrylate, polyvinylpyrrolidone, polyvinyl ether, polyvi-nylidene fluoride, and poly(vinylidene fluoride-hexafluoro-propylene).

Electrochemical Apparatus

This application further provides an electrochemical apparatus, and the electrochemical apparatus includes a positive electrode, an electrolyte solution, and a negative electrode. The positive electrode includes a positive elec-trode active material layer and a positive electrode current collector, the negative electrode includes a negative elec-trode active material layer and a negative electrode current collector, and the negative electrode active material layer includes the negative electrode active material according to this application.

The electrochemical apparatus according to this applica-tion includes any apparatus in which an electrochemical reaction takes place. Specific examples of the apparatus include all kinds of primary batteries, secondary batteries, fuel batteries, solar batteries, or capacitors. Specially, the electrochemical apparatus is a lithium secondary battery, including a lithium metal secondary battery, a lithium-ion secondary battery, a lithium polymer secondary battery, or a lithium-ion polymer secondary battery.

Electronic Apparatus

This application also provides an electronic apparatus, including the electrochemical apparatus according to this application.

The electrochemical apparatus according to this applica-tion is not particularly limited to any purpose, and may be any known electronic apparatus in the prior art. In some implementations, the electrochemical apparatus in this application may be applied to, but is not limited to, a notebook computer, a pen-input computer, a mobile com-puter, an electronic book player, a portable telephone, a portable fax machine, a portable copier, a portable printer, a headset, a video recorder, a liquid crystal television, a portable cleaner, a portable CD player, a mini-disc, a trans-ceiver, an electronic notebook, a calculator, a storage card, a portable recorder, a radio, a standby power source, a motor, an automobile, a motorcycle, a motor bicycle, a bicycle, a lighting appliance, a toy, a game console, a clock, an electric tool, a flash lamp, a camera, a large household battery, a lithium-ion capacitor, and the like.

The following describes preparation of a lithium-ion battery based on specific examples by using the lithium-ion battery as an example. Persons skilled in the art shall understand that the preparation method described in this application is only an example, and any other appropriate preparation method falls within the scope of this application.

Examples

The following describes examples and comparative examples of the lithium-ion battery according to this appli-cation, to perform performance evaluation.

I. Preparation of the Lithium-Ion Battery

1. Preparation of a Negative Electrode

Graphite, styrene-butadiene rubber (SBR), and sodium carboxymethyl cellulose (CMC) were well stirred and mixed in an appropriate amount of deionized water at a weight ratio of 97.2:1.8:1, to form a uniform negative electrode slurry. The negative electrode slurry was coated on a negative electrode current collector (copper foil), and was dried, cold pressed, cut, and slitted, to obtain the negative electrode. The degree of graphitization of the graphite was implemented by controlling graphitization temperature and holding time. Heating time was in a range of 12 to 17 hours, and temperature was increased to a range of 2600° C. to 3000° C., and then the temperature was maintained. The holding time was in a range of 85 h to 100 h, and the temperature was naturally cooled. The aspect ratio was controlled through shaping and screening processes.

2. Preparation of the Positive Electrode

Lithium iron phosphate ($LiFePO_4$), acetylene black used as a conductive agent, and polyvinylidene fluoride (PVDF) used as a binder were well stirred and mixed in an appro-priate amount of an N-methylpyrrolidone (NMP) solvent at a weight ratio of 96.3:2.2:1.5, to make a uniform positive electrode slurry. The slurry was coated on aluminum foil of a positive electrode current collector, and was dried, cold pressed, cut, and slitted, to obtain the positive electrode.

3. Preparation of an Electrolyte Solution

In a dry argon atmosphere glove box, ethylene carbonate (EC), diethyl carbonate (DEC), and propylene carbonate (PC) were uniformly mixed at a mass ratio of 2:6:2, fluo-roethylene carbonate and succinonitrile were then added at 3% thereto, dissolved and well stirred, and lithium salt $LiPF_6$ was then added and well mixed to obtain the electro-lyte solution, where a concentration of $LiPF_6$ is 1 mol/L.

4. Preparation of a Separator

A polyethylene (PE) porous polymer film was used as the separator.

5. Preparation of the Lithium-Ion Battery

The positive electrode, the separator, and the negative electrode were laminated in order, so that the separator was placed between the positive electrode and the negative electrode for an isolation purpose, and then a bare cell was obtained through winding; and after a tab was welded, the bare cell was placed in an aluminum plastic film of an outer package, the prepared electrolyte solution was injected into the dried bare cell, and processes such as vacuum packaging, standing, chemical conversion, shaping, and capacity testing were performed, to obtain the lithium-ion battery.

II. Test Method

1. Test method of aspect ratio distribution of the negative electrode active material Sympatec QICPIC dynamic particle image analyzer was used to measure the aspect ratio distribution of the negative electrode active material.

2. Test method of the degree of graphitization of the negative electrode active material Based on JJS K 0131-1996 "Principles of X-ray Diffrac-tion Analysis", an interplanar spacing $d_{002}$, was measured, and an instrument was Bruker X-ray single crystal diffrac-tometer (XRD). A diffraction angle $\theta$ was determined through a diffraction peak, the interplanar spacing d002, was calculated through the Bragg equation $2 d \sin \theta = \lambda$, and then the degree of graphitization was obtained by using a formula $G = (0.3440 - d_{002})/(0.3440 - 0.3354) \times 100\%$ for calculating the degree of graphitization, where in the formula, G is the degree of graphitization %, and $d_{002}$, is an interlayer dis-tance nm of crystal planes of the carbon material (002).

3. Test Method of C004/C110 for the Negative Electrode Active Material Layer

A diffraction pattern of a plane (004) and a diffraction pattern of a plane (110) in an X-ray diffraction graph of a negative electrode active material layer were measured based on Machinery Industry Standard of the People's Republic of China JB/T 4220-2011 "Determination Method of Lattice Parameters of Artificial Graphite". When the diffraction pattern of 004 was recorded, a scanning range of a diffraction angle 2θ was 53° to 57°. When the diffraction pattern of 110 was recorded, a scanning range of a diffraction angle 2θ was 75° to 79°. A peak area obtained through the diffraction pattern of the plane (004) was denoted as C004. A peak area obtained through the diffraction pattern of the plane (110) was denoted as C110. A ratio C004/C110 for the negative electrode active material layer was calculated.

4. Test Method of Id/Ig for the Negative Electrode Active Material Layer

A peak intensity Id of the negative electrode active material layer at 1340 $cm^{-1}$ to 1380 $cm^{-1}$ and a peak intensity Ig at 1560 $cm^{-1}$ to 1600 $cm^{-1}$ was measured in a Raman spectroscopy method. Id/Ig is a calculated ratio of the peak intensity Id of D to a peak intensity Ig of G.

5. Test Method of a Compacted Density of the Negative Electrode Active Material Layer A compacted density of an active material layer was tested based on National Standard of the People's Republic of China GB/T 24533-2009 "Graphite Negative Electrode Materials for Lithium-ion Batteries". The obtained compacted density of the active material layer was a density obtained after decompression of 5T.

6. Test Method of a Particle Size of the Negative Electrode Active Material

Based on the National Standard of the People's Republic of China GB/T 19077-2016 "Particle Size Analysis-Laser Diffraction Method", a particle size of an active material was tested by using Malvern Particle Size Analyzer, Malvern Master Size 3000. The negative electrode material was dispersed in the dispersant (ethanol), and ultrasonically treated for 30 minutes, and the sample was then added to the Malvern Particle Size Analyzer to start the test. In volume-based particle size distribution, for the negative electrode material, a particle size satisfying that a cumulative volume reaches 10% starting from a small particle size side is Dv10 of the negative electrode material; and in the volume-based particle size distribution, for the negative electrode material, a particle size satisfying that a cumulative volume reaches 99% starting from a small particle size side is Dv99 of the negative electrode material.

7. Test Method of an Interplanar Spacing of the Negative Electrode Active Material Based on JJS K 0131-1996 "Principles of X-ray Diffraction Analysis", an interplanar spacing $d_{002}$, was measured, and an instrument was Bruker X-ray single crystal diffractometer (XRD). A diffraction angle θ was determined through a diffraction peak, and the interplanar spacing $d_{002}$, was calculated through the Bragg equation $2\ dsin\ \theta=\lambda$.

8. Test Method of a Gram Capacity of the Lithium-Ion Battery

To test a gram capacity of the active material by using a blue battery tester, a button battery was first assembled, and a button battery model was CR2430. A fully discharged lithium-ion battery was disassembled to obtain a negative electrode, an area of the negative electrode current collector with negative electrode active material layers on both faces (or an area with active material layers on both faces might be selected, and an active material layer on one face was erased) was selected, and a disc with a diameter of 14 mm was cut off and weighed, with the weight recorded as $m_0$ g; and an active material layer on one face was erased and the disc was weighed, with the weight recorded as $m_1$ g. A weight $m_2$ (g) of a single-faced active material layer satisfies $m_2$ (g)=$m_0$–$m_1$. The foregoing prepared electrolyte solution was added, and the lithium metal plate was used as a counter electrode to assemble the button battery. Test temperature was 23° C. to 26° C., and a test process was performed: The battery was discharged at 0.05 C to 5 mV, then further discharged at 0.05 mA to 5 mV, discharged at 0.02 mA to 5 mV, and charged at 0.1 C to 2.0 V; and a discharge capacity was recorded. The weight of the negative electrode active material can be calculated based on such formula: m (g)=$m_2$×0.972. A value C (mAh/g) of the gram capacity of the negative electrode active material satisfied that C (mAh/ g)=discharge capacity/weight of a negative electrode active material.

9. Test Method of a Post-Cycle Capacity Retention Rate of the Lithium-Ion Battery At 25° C., the lithium-ion battery was charged with a 1 C direct current to 3.6 V, then charged at a 3.6 V constant voltage to 0.05 C, left to stand for 10 minutes, and then discharged with a 1 C direct current to 2.5 V. This was a cycle, and a discharge capacity of the first cycle was recorded. The foregoing steps were repeated 1000 times, and discharge capacities after the cycle were recorded. The post-cycle capacity retention rate of the lithium-ion battery was calculated by using the following formula:

Post-cycle capacity retention rate=(discharge capacity after cycling/discharge capacity at the first cycle)×100%

10. Test Method of a Thickness Rebound Rate of the Lithium-Ion Battery

At 45° C., the lithium-ion battery was charged with a 1 C direct current to 3.6 V, then charged at a 3.6 V constant voltage to 0.05 C, left to stand for 10 minutes, and then discharged with a 1 C direct current to 2.5 V. This was a cycle, and a thickness H0 of the lithium-ion battery after being charged at the 3.6 V constant voltage to 0.05 C and left to stand for 10 minutes in the cycle period was recorded. The foregoing steps were repeated 1000 times, and a thickness H1 of the lithium-ion battery after being charged at the 3.6 V constant voltage to 0.05 C and left to stand for 10 minutes in the $1000^{th}$ cycle period was recorded. The thickness rebound rate of the lithium-ion battery was calculated by using the following formula:

Thickness rebound rate=(H1–H0)/H0×100%.

III. Test Result

Table 1 shows an impact of a proportion of a carbon material with a degree of graphitization and an aspect ratio in a negative electrode active material on cycle performance of a lithium-ion battery.

TABLE 1

| No. | Proportion of particles with an aspect ratio greater than or equal to 3.3 | Proportion of particles with an aspect ratio greater than or equal to 2 | Proportion of particles with an aspect ratio greater than or equal to 1.5 | Gr | Post-cycle capacity retention rate | Thickness rebound rate |
|---|---|---|---|---|---|---|
| Example 1 | 1% | 53% | 79% | 0.82 | 92.6% | 3.01% |
| Example 2 | 3% | 53% | 79% | 0.85 | 93.1% | 3.00% |
| Example 3 | 6% | 53% | 79% | 0.87 | 93.2% | 3.00% |
| Example 4 | 8% | 53% | 79% | 0.89 | 93.2% | 2.98% |
| Example 5 | 10% | 53% | 79% | 0.92 | 92.5% | 3.03% |
| Example 6 | 9% | 53% | 79% | 0.82 | 93.1% | 3.01% |
| Comparative Example 1 | 8% | 53% | 79% | 0.81 | 84.0% | 5.08% |
| Comparative Example 2 | 8% | 53% | 79% | 0.93 | 83.8% | 5.13% |
| Comparative Example 3 | 8% | 53% | 79% | 0.95 | 83.7% | 5.15% |
| Comparative Example 4 | 11% | 53% | 79% | 0.82 | 83.8% | 5.88% |
| Comparative Example 5 | 12% | 53% | 79% | 0.87 | 83.6% | 5.82% |
| Comparative Example 6 | 13% | 53% | 79% | 0.92 | 83.1% | 5.91% |
| Comparative Example 7 | 14% | 53% | 79% | 0.89 | 83.3% | 5.92% |
| Comparative Example 8 | 13% | 53% | 79% | 0.81 | 83.2% | 5.92% |
| Comparative Example 9 | 13% | 53% | 79% | 0.93 | 83.5% | 5.93% |
| Comparative Example 10 | 13% | 53% | 79% | 0.95 | 83.3% | 5.95% |
| Comparative Example 11 | 12% | 53% | 79% | 0.93 | 83.0% | 5.96% |
| Comparative Example 12 | 12% | 53% | 79% | 0.95 | 83.8% | 5.97% |

As shown in Comparative Example 1, when a proportion of particles with an aspect ratio greater than or equal to 3.3 in the carbon material is less than 10% of a total quantity of particles but a degree of graphitization of the carbon material is less than 0.82, the post-cycle capacity retention rate of the lithium-ion battery is relatively low, and the thickness rebound rate is relatively high.

As shown in Comparative Examples 2 and 3, when a proportion of particles with an aspect ratio greater than or equal to 3.3 in the carbon material is less than 10% of a total quantity of particles but a degree of graphitization of the carbon material is greater than 0.92, the post-cycle capacity retention rate of the lithium-ion battery is relatively low, and the thickness rebound rate is relatively high.

As shown in Comparative Examples 4 to 7, when a degree of graphitization of the carbon material falls within a range of 0.82 to 0.92 but a proportion of particles with an aspect ratio greater than or equal to 3.3 in the carbon material is greater than 10% of a total quantity of particles, the post-cycle capacity retention rate of the lithium-ion battery is relatively low, and the thickness rebound rate is relatively high.

As shown in Comparative Example 8, when a degree of graphitization of the carbon material is less than 0.82 and a proportion of particles with an aspect ratio greater than or equal to 3.3 in the carbon material is greater than 10% of a total quantity of particles, the post-cycle capacity retention rate of the lithium-ion battery is relatively low, and the thickness rebound rate is relatively high.

As shown in Comparative Examples 9 to 12, when a degree of graphitization of the carbon material is greater than 0.92 and a proportion of particles with an aspect ratio greater than or equal to 3.3 in the carbon material is greater than 10% of a total quantity of particles, the post-cycle capacity retention rate of the lithium-ion battery is relatively low, and the thickness rebound rate is relatively high.

As shown in Comparative Examples 1 to 6, when a degree of graphitization of the carbon material falls within a range of 0.82 to 0.92 and a proportion of particles with an aspect ratio greater than or equal to 3.3 in the carbon material is less than 10% of a total quantity of particles, the post-cycle capacity retention rate of the lithium-ion battery significantly increases, and the thickness rebound rate significantly reduces. In other words, cycle performance of the lithium-ion battery has been significantly improved.

Table 2 shows an impact of a proportion of a carbon material with an aspect ratio in a negative electrode active material on cycle performance of a lithium-ion battery. Examples 7 to 12 are amendments based on Example 3, and an only difference lies in parameters listed in Table 2.

TABLE 2

| | Proportion of particles with an aspect ratio greater than or equal to 2 | Proportion of particles with an aspect ratio greater than or equal to 1.5 | Post-cycle capacity retention rate | Thickness rebound rate |
|---|---|---|---|---|
| Example 3 | 53% | 79% | 93.2% | 3.00% |
| Example 7 | 33% | 65% | 93.5% | 2.98% |
| Example 8 | 36% | 68% | 93.6% | 2.98% |
| Example 9 | 40% | 73% | 93.7% | 2.99% |

TABLE 2-continued

| | Proportion of particles with an aspect ratio greater than or equal to 2 | Proportion of particles with an aspect ratio greater than or equal to 1.5 | Post-cycle capacity retention rate | Thickness rebound rate |
|---|---|---|---|---|
| Example 10 | 45% | 77% | 93.3% | 2.98% |
| Example 11 | 50% | 80% | 93.4% | 2.99% |
| Example 12 | 56% | 85% | 92.9% | 3.02% |

Results indicate that, when a proportion of particles with an aspect ratio greater than or equal to 2 in the carbon material is less than 50% and a proportion of particles with an aspect ratio greater than or equal to 1.5 is less than 80%, the post-cycle capacity retention rate of the lithium-ion battery may be further increased, and the thickness rebound rate is further reduced.

Table 3 shows an impact of a crystal grain size and a degree of graphitization of a carbon material, and a compacted density of a negative electrode active material on cycle performance of a lithium-ion battery. Examples 13 to 22 are amendments based on Example 8, and an only difference lies in parameters listed in Table 3.

TABLE 3

| | K × Gr | 2.5 Gr-0.45 | PD (g/cm$^3$) | Retention rate after cycling | Thickness rebound rate |
|---|---|---|---|---|---|
| Example 8 | 3.8 | 1.725 | 1.80 | 93.6% | 2.98% |
| Example 13 | 4.0 | 1.725 | 1.58 | 94.2% | 2.89% |
| Example 14 | 4.83 | 1.725 | 1.63 | 94.2% | 2.88% |
| Example 15 | 5.18 | 1.725 | 1.66 | 94.1% | 2.85% |
| Example 16 | 5.2 | 1.725 | 1.66 | 94.2% | 2.85% |
| Example 17 | 4.75 | 1.725 | 1.74 | 94.3% | 2.85% |
| Example 18 | 4.6 | 1.725 | 1.77 | 94.2% | 2.85% |
| Example 19 | 3.79 | 1.725 | 1.52 | 93.6% | 2.90% |
| Example 20 | 3.85 | 1.725 | 1.61 | 93.7% | 2.88% |
| Example 21 | 5.25 | 1.725 | 1.65 | 93.8% | 2.91% |
| Example 22 | 5.4 | 1.725 | 1.65 | 93.8% | 2.92% |

Results indicate that, when a ratio K of a crystal grain size La to a crystal grain size Lc of the carbon material and the degree of graphitization Gr satisfy that 4.0≤KxGr≤5.2 and/ or a value PD of the compacted density of the negative electrode active material layer and the degree of graphitization Gr of the carbon material satisfy that PD≤2.5Gr-0.45≤1.85 and PD is 1.45 to 1.75, the post-cycle capacity retention rate and the thickness rebound rate of the lithium-ion battery can be further improved.

Table 4 shows an impact of a particle size, an interplanar spacing, and orientation of a negative electrode active material on performance of a lithium-ion battery. Examples 23 to 29 are amendments based on Example 16, and an only difference lie in parameters listed in Table 4.

TABLE 4

| | DV99-DV10 (μm) | d002 (nm) | C004/C110 for a negative electrode active material | Post-cycle capacity retention rate | Thickness rebound rate |
|---|---|---|---|---|---|
| Example 16 | 30 | 0.3362 | 9.02 | 94.2% | 2.85% |
| Example 23 | 35 | 0.3375 | 5.05 | 94.8% | 2.71% |
| Example 24 | 40 | 0.3367 | 5.34 | 94.9% | 2.71% |
| Example 25 | 50 | 0.3372 | 4.60 | 94.9% | 2.70% |
| Example 26 | 42 | 0.3369 | 5.78 | 95.1% | 2.70% |
| Example 27 | 38 | 0.3366 | 6.94 | 95.0% | 2.71% |
| Example 28 | 38 | 0.3362 | 7.46 | 94.6% | 2.73% |
| Example 29 | 39 | 0.3367 | 8.53 | 94.8% | 2.80% |

When the particle size of the negative electrode active material satisfies 35 μm<Dv99–Dv10<50 μm, the interplanar spacing $d_{002}$≥0.3365 nm, and/or C004/C110≤8, the post-cycle capacity retention rate and the thickness rebound rate of the lithium-ion battery can be further improved.

Table 5 shows an impact of a gram capacity of the negative electrode active material on cycle performance of a lithium-ion battery. Examples 30 to 36 are amendments based on Example 24, and an only difference lies in parameters listed in Table 5.

TABLE 5

| | Gram capacity C (mAh/g) | 390 Gr-C | Post-cycle capacity retention rate | Thickness rebound rate |
|---|---|---|---|---|
| Example 24 | 318 | 21.3 | 94.9% | 2.71% |
| Example 30 | 320 | 19.3 | 95.7% | 2.55% |
| Example 31 | 327 | 12.3 | 95.6% | 2.57% |
| Example 32 | 330 | 9.3 | 95.6% | 2.56% |
| Example 33 | 335 | 4.3 | 95.9% | 2.58% |
| Example 34 | 338 | 1.3 | 95.8% | 2.59% |
| Example 35 | 345 | −5.7 | 95.4% | 2.59% |
| Example 36 | 355 | −15.7 | 95.2% | 2.65% |

Results indicate that, when a value C of a gram capacity and the degree of graphitization Gr of the negative electrode active material satisfy that 390Gr–C≤20 and C≤350, the post-cycle capacity retention rate and the thickness rebound rate of the lithium-ion battery can be further improved.

In addition, C004'/C110' for the negative electrode active material layer in the lithium-ion battery in Example 33 is 8.63, and Id/Ig is 0.25; and C004/C110 for the negative electrode active material is 5.78. The lithium-ion battery in Example 36 is cyclically used 3000 times by cyclically performing steps in "Test method of a post-cycle capacity retention rate of the lithium-ion battery". Then, the fully charged lithium-ion battery was disassembled, and a negative electrode was extracted, washed, and dried. The negative electrode active material layer and the negative electrode active material were extracted. After the test, C004'/ C110' for the negative electrode active material layer after cycling is 8.51, and Id/Ig is 0.37; and C004/C110 for the negative electrode active material after cycling is 5.76. C004'/C110' for the negative electrode active material layer after cycling still falls within the range of 7 to 18, and Id/Ig still falls within the range of 0.2 to 0.5. That is, after cycling, orientation of the negative electrode active material layer of the lithium-ion battery in this application does not change significantly, and the active material has a stable structure.

Figure 6:
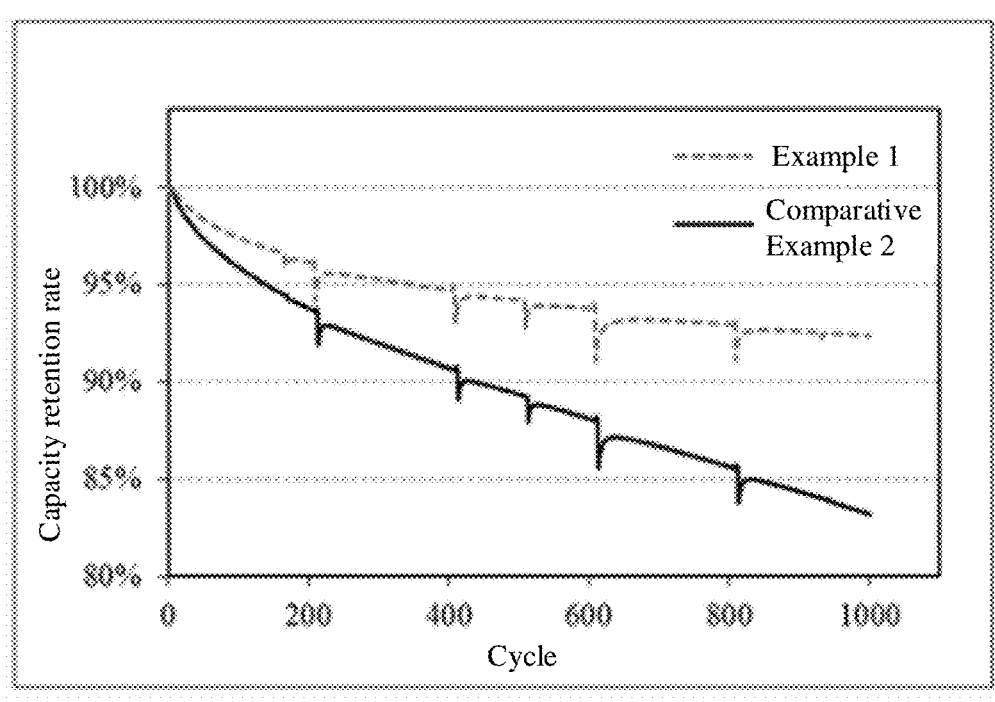
FIG. 6 is a curve chart of a post-cycle capacity retention rate with a quantity of cycles according to Comparative Example 2 and Example 1 of this application.

FIG. 6 is a curve chart of a post-cycle capacity retention rate with a quantity of cycles according to Comparative Example 2 and Example 1 of this application. As indicated in the results, a post-cycle capacity retention rate of the lithium-ion battery in Example 1 is significantly higher than that of the lithium-ion battery in Comparative Example 2.

Figure 7:
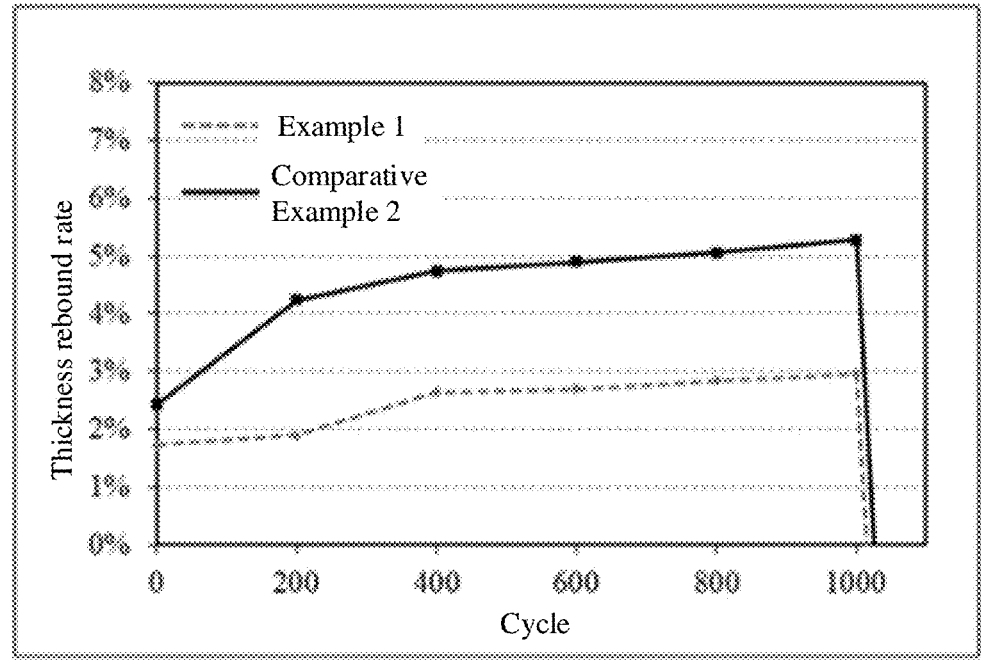
FIG. 7 is a curve chart of a thickness rebound rate with a quantity of cycles according to Comparative Example 2 and Example 1 of this application.

FIG. 7 is a curve chart of a thickness rebound rate with a quantity of cycles according to Comparative Example 2 and Example 1 of this application. As indicated in the results, a thickness rebound rate of the lithium-ion battery in Example 1 is significantly lower than that of the lithium-ion battery in Comparative Example 2.

References to "embodiments", "some embodiments", "an embodiment", "another example", "examples", "specific examples", or "some examples" in this specification mean the inclusion of specific features, structures, materials, or characteristics described in the embodiment or example in at least one embodiment or example of the application. Therefore, descriptions in this specification, such as "in some implementations", "in the embodiments", "in an embodiment", "in another example", "in an example", "in a particular example", or "for example", are not necessarily references to the same embodiments or examples in this application. In addition, specific features, structures, materials, or characteristics herein may be incorporated in any suitable manner into one or more embodiments or examples.

Although illustrative embodiments have been demonstrated and described, those skilled in the art should understand that the above embodiments are not to be construed as limitation on the application, and that the embodiments may be changed, replaced, and modified without departing from the spirit, principle, and scope of this application.

What is claimed is:

1. A negative electrode active material comprising: a carbon material; wherein a degree of graphitization Gr of the carbon material measured by an X-ray diffraction analysis method is 0.82 to 0.92; and based on a total quantity of particles of the carbon material, a proportion of particles with an aspect ratio greater than 3.3 in the carbon material is greater than 1% and less than 10%; and based on the total quantity of the particles of the carbon material, a proportion of particles with an aspect ratio greater than 2 in the carbon material is greater than 30% and less than 50%.

2. The negative electrode active material according to claim 1, wherein, based on the total quantity of the particles of the carbon material, a proportion of particles with an aspect ratio greater than 1.5 in the carbon material is less than 80%.

3. The negative electrode active material according to claim 1, wherein, a ratio of a crystal grain size La of a crystal grain of the carbon material along a horizontal axis measured by the X-ray diffraction analysis method to a crystal grain size Lc of a crystal grain of the carbon material along a vertical axis measured by the X-ray diffraction analysis method is K, and $4.0 \leq K \times Gr \leq 5.2$.

4. The negative electrode active material according to claim 1, wherein, a particle size of the negative electrode active material satisfies the following relationship: 35 $\mu m < Dv99 - Dv10 < 50$ $\mu m$.

5. The negative electrode active material according to claim 1, wherein, the negative electrode active material satisfies at least one of conditions (a) to (d):

(a) based on the total quantity of particles of the carbon material, a proportion of particles with an aspect ratio greater than 3.3 in the carbon material is 3% to 8%;

(b) a ratio of a crystal grain size La of a crystal grain of the carbon material along a horizontal axis measured by the X-ray diffraction analysis method to a crystal grain size Lc of a crystal grain of the carbon material along a vertical axis measured in the X-ray diffraction analysis method is K, and $4.2 \leq K \times Gr \leq 5.0$;

(c) based on the total quantity of the particles of the carbon material, the proportion of particles with an aspect ratio greater than 2 in the carbon material is less than 30% and less than 40%, and a proportion of particles with an aspect ratio greater than 1.5 in the carbon material is less than 70%;

(d) a particle size of the negative electrode active material satisfies the following relationship: 42 $\mu m < Dv99 - Dv10 < 48$ $\mu m$.

6. The negative electrode active material according to claim 1, wherein, an interplanar spacing d002 of the negative electrode active material measured by the X-ray diffraction analysis method satisfies $d002 \geq 0.3365$ nm.

7. The negative electrode active material according to claim 1, wherein, a ratio of a peak area C004 of a crystal plane (004) to a peak area C110 of a crystal plane (110) of the negative electrode active material measured by the X-ray diffraction analysis method satisfies $C004/C110 \leq 8$.

8. The negative electrode active material according to claim 1, wherein, a gram capacity C mAh/g of the negative electrode active material and the degree of graphitization Gr of the carbon material satisfy the following relationships: $390Gr - C \leq 20$, and $C \leq 350$.

9. An electrochemical apparatus, comprising a positive electrode, an electrolyte solution and a negative electrode; the negative electrode comprising a negative electrode active material layer and a negative electrode current collector, wherein the negative electrode active material layer comprises the negative electrode active material;

the negative electrode active material comprises a carbon material, wherein a degree of graphitization Gr of the carbon material measured by an X-ray diffraction analysis method is 0.82 to 0.92; and based on a total quantity of particles of the carbon material, a proportion of particles with an aspect ratio greater than 3.3 in the carbon material is greater than 1% and less than 10%; and based on the total quantity of the particles of the carbon material, a proportion of particles with an aspect ratio greater than 2 in the carbon material is greater than 30% and less than 50%.

10. The electrochemical apparatus according to claim 9, wherein, based on the total quantity of the particles of the carbon material, a proportion of particles with an aspect ratio greater than 1.5 in the carbon material is less than 80%.

11. The electrochemical apparatus according to claim 9, wherein, a ratio of a crystal grain size La of a crystal grain of the carbon material along a horizontal axis measured by the X-ray diffraction analysis method to a crystal grain size Lc of a crystal grain of the carbon material along a vertical axis measured by the X-ray diffraction analysis method is K, and $4.0 \leq K \times Gr \leq 5.2$.

12. The electrochemical apparatus according to claim 9, wherein, a particle size of the negative electrode active material satisfies the following relationship: 35 $\mu m < Dv99 - Dv10 < 50$ $\mu m$.

13. The electrochemical apparatus according to claim 9, wherein, an interplanar spacing d002 of the negative electrode active material measured by the X-ray diffraction analysis method satisfies $d002 \geq 0.3365$ nm.

14. The electrochemical apparatus according to claim 9, wherein, a ratio of a peak area C004 of a crystal plane (004) to a peak area C110 of a crystal plane (110) of the negative electrode active material that is measured in by the X-ray diffraction analysis method satisfies C004/C110≤8.

15. The electrochemical apparatus according to claim 9, wherein, a compacted density PD g/cm³ of the negative electrode active material layer and the degree of graphitization Gr of the carbon material satisfy the following relationships: PD≤2.5Gr−0.45≤1.85, and PD is 1.45 to 1.75.

16. The electrochemical apparatus according to claim 9, wherein, a ratio C004'/C110' of a peak area C004' of a plane (004) to a peak area C110' of a plane (110) of the negative electrode active material layer that is measured in the X-ray diffraction analysis method is 7 to 18.

17. The electrochemical apparatus according to claim 9, wherein, a ratio Id/Ig of a peak intensity Id of the negative electrode active material layer at 1340 cm⁻¹ to 1380 cm⁻¹ to a peak intensity Ig of the negative electrode active material layer at 1560 cm⁻¹ to 1600 cm⁻¹ measured in a Raman spectroscopy method is 0.2 to 0.5.

18. An electronic apparatus, comprising an electrochemical apparatus; the electrochemical apparatus comprising a positive electrode, a negative electrode, a separator and an electrolyte solution; the negative electrode comprising a negative electrode current collector and a negative electrode active material layer, wherein the negative electrode active material layer comprises a negative electrode active material;

the negative electrode active material comprises a carbon material, wherein a degree of graphitization Gr of the carbon material measured by an X-ray diffraction analysis method is 0.82 to 0.92, and based on a total quantity of particles of the carbon material, a proportion of particles with an aspect ratio greater than 3.3 in the carbon material is greater than 1% and less than 10%; and based on the total quantity of the particles of the carbon material, a proportion of particles with an aspect ratio greater than 2 in the carbon material is greater than 30% and less than 50%.

19. The negative electrode active material according to claim 1, wherein, based on the total quantity of particles of the carbon material, the proportion of particles with an aspect ratio greater than 3.3 in the carbon material is 3% to 8%.

20. The negative electrode active material according to claim 1, wherein a negative electrode active material layer formed from the negative electrode active material has a compacted density of 1.45 to 1.75 g/cm³.

* * * * *